US010662846B2

(12) United States Patent
Nilsson et al.

(10) Patent No.: US 10,662,846 B2
(45) Date of Patent: May 26, 2020

(54) DEVICE AND METHOD AT AN EXHAUST AFTERTEATMENT SYSTEM FOR AN ENGINE

(71) Applicant: SCANIA CV AB, Södertälje (SE)

(72) Inventors: Magnus Nilsson, Årsta (SE); Henrik Birgersson, Stockholm (SE); Andreas Liljestrand, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 15/816,124

(22) Filed: Nov. 17, 2017

(65) Prior Publication Data
US 2018/0073409 A1   Mar. 15, 2018

Related U.S. Application Data

(63) Continuation of application No. 14/889,538, filed as application No. PCT/SE2014/050622 on May 21, 2014, now Pat. No. 9,957,869.

(30) Foreign Application Priority Data

May 21, 2013  (SE) ...................................... 1350616

(51) Int. Cl.
F01N 3/20      (2006.01)
F01N 3/22      (2006.01)

(52) U.S. Cl.
CPC .............. F01N 3/208 (2013.01); F01N 3/22 (2013.01); F01N 2610/02 (2013.01);
(Continued)

(58) Field of Classification Search
CPC .. F01N 2610/00; F01N 2610/02; F01N 3/208; F01N 3/22; F01N 2900/08;
(Continued)

(56) References Cited

U.S. PATENT DOCUMENTS 6,981,368 B2    1/2006  van Nieuwstadt
8,079,211 B2 *  12/2011 Levin .................. B01F 3/04049
                                                 60/274

(Continued)

OTHER PUBLICATIONS

International Search Report dated Aug. 26, 2014 issued in International patent application No. PCT/SE2014/050622.

Primary Examiner — Phutthiwat Wongwian
Assistant Examiner — Diem T Tran
(74) Attorney, Agent, or Firm — Ostrolenk Faber LLP

(57) ABSTRACT

A method at an exhaust gas cleaning system for an engine (235) in which a reducing agent is added to a passage (290) for exhaust gases from the engine (235) for cleaning the exhaust gases. The exhaust gas cleaning system includes arrangements (270) that require a certain temperature level (Tmax) in order to achieve catalytic exhaust gas cleaning. The method is to distribute and store (s430) a limited amount of reducing agent at temperature level (Tmax); and to use (s440) during a cold start of the exhaust gas cleaning system, the distributed and stored reducing agent to achieve the catalytic exhaust gas cleaning. Also a computer program product (200; 210) to implement the method. Also an arrangement for an exhaust gas cleaning system for an engine (235), and a motor vehicle (100) equipped with the arrangement.

9 Claims, 4 Drawing Sheets

(52) U.S. Cl.
CPC .. *F01N 2900/08* (2013.01); *F01N 2900/1404* (2013.01); *F01N 2900/1602* (2013.01); *F01N 2900/1811* (2013.01); *Y02A 50/2325* (2018.01); *Y02T 10/24* (2013.01)

(58) Field of Classification Search
CPC ..... F01N 2900/1404; F01N 2900/1602; F01N 2900/1811; Y02T 10/24; Y02A 50/2325
USPC .................................. 60/284, 286, 301, 303
See application file for complete search history.

(56) References Cited

U.S. PATENT DOCUMENTS

| | | |
|---|---|---|
| 8,789,358 B2 | 7/2014 | Vosz |
| 2005/0034450 A1 | 2/2005 | Itoh et al. |
| 2005/0069476 A1 | 3/2005 | Blakeman et al. |
| 2012/0023906 A1 | 2/2012 | Yezerets et al. |
| 2012/0047882 A1 | 3/2012 | Kidokoro et al. |

\* cited by examiner s401 s410
 s420
 s430
 s440

DEVICE AND METHOD AT AN EXHAUST AFTERTEATMENT SYSTEM FOR AN ENGINE

CROSS-REFERENCE TO RELATED APPLICATIONS

The present application is a continuation of U.S. patent application Ser. No. 14/889,538, filed Nov. 6, 2015, which is a 35 U.S.C. § 371 national phase conversion of PCT/SE2014/050622, filed May 21, 2014, which claims priority of Swedish Patent Application No. 1350616-7, filed May 21, 2013, the content of each of these applications are incorporated by reference herein. The PCT International Application was published in the English language.

TECHNICAL AREA

The present invention concerns a method for an exhaust gas cleaning system for an engine. The exhaust gas cleaning system may include an SCR catalyst. The invention concerns also a computer program comprising program code for a computer to implement a method according to the invention. The invention concerns also an arrangement for an exhaust gas cleaning system for an engine and a motor vehicle that is equipped with the arrangement.

BACKGROUND

In currently available vehicles, urea, for example, a reductant is used in SCR systems (where "SCR" is an abbreviation for "selective catalytic reduction") comprising an SCR catalyst. The reductant and $NO_x$ gas can react in which the catalyst and be converted to nitrogen gas and water. Different types of reductants can be used in SCR systems. One commonly used reductant is, for example, a reductant under the trademark, AdBlue. Such an SCR system may be applied also at a stationary application.

The SCR system may also include also a diesel oxidation catalyst (DOC). The DOC is arranged, among other things, to convert NO gas from an engine to $NO_2$ gas. In prior art technology, the DOC is arranged upstream of the SCR catalyst and upstream also of the position for the dosage of reduction agent, where relevant.

One type of SCR system includes a container that contains a reductant. The SCR system also has a pump configured to pump up the reductant from the container through a suction pipe and to supply it through a pressurized pipe to a dosage unit that is arranged at an exhaust gas system on the vehicle, for example, at an exhaust pipe at the exhaust gas system. The dosage unit is configured to inject a required amount of reductant into an exhaust gas system upstream of the SCR catalyst according to drive routines that are stored in a control unit in the vehicle.

There is an ever-present need to reduce the amount of emissions from engines in motor vehicles. This applies to heavy motor vehicles such as, trucks and buses, since legal requirements for emissions are continuously being tightened.

During a "cold start" of an SCR system at the motor vehicle, it takes a certain period until the components that make up the system achieve an appropriate operating temperature. No reducing agent is dosed during this period, which means that it is then not possible to reduce undesired emissions to a suitable extent. Dosage during this period does not take place in order to avoid formation of deposits of reducing agent in the exhaust gas cleaning system upstream of the SCR catalyst. In certain cases, it may be a period of up to 10 minutes, during which an engine creates emissions without reducing agent being dosed.

US20050069476 describes a system in which the dosage of reducing agent is carried out in association with switching off an engine of a vehicle to achieve the storage of ammonia in an SCR catalyst.

US20120023906 also describes a system in which the dosage of reducing agent is carried out in association with switching off an engine a vehicle to achieve the storage of ammonia in an SCR catalyst.

These solutions, however, have a number of disadvantages. It is necessary, for example, for an exhaust gas treatment system in this case to demonstrate a rather high temperature in order for the reducing agent to be vaporized in an appropriate manner. Furthermore, the engine will need to be operated, and in this case to produce a flow of exhaust gas, such that it is possible to add the dosed reducing agent to the SCR catalyst. There is also an imminent risk with the prior art systems that that unreasonably large quantities of "urea deposits" are formed. These may persist permanently or they may often increase in size if dosage is continuous, which will reduce the performance of the SCR system and may sometimes lead to a sound absorber, including the SCR catalyst, needing to be repaired or exchanged, with very high costs as a consequence.

SUMMARY OF THE INVENTION

One purpose of the present invention is to provide a new and advantageous method for an exhaust gas cleaning system for an engine.

A further purpose of the invention is to provide a new and advantageous arrangement and a new and advantageous computer program for an exhaust gas cleaning system for an engine.

A further purpose of the invention is to provide a method, an arrangement and a computer program in order to achieve a reduction in the amount of undesired emissions during a starting procedure of an engine, where a temperature at a post-processing system does not exceed a predetermined temperature, for example 200 degrees Celsius.

A further purpose of the invention is to provide a method, an arrangement and a computer program in order to achieve an increased performance at a platform that includes an engine with an exhaust gas treatment system.

A further purpose of the invention is to provide a method, an arrangement and a computer program in order to achieve an increased performance at an SCR system.

According to one aspect of the present invention, a method is provided for an exhaust gas cleaning system for an engine which comprises adding a reducing agent to a passage for exhaust gases from the engine for cleaning the exhaust gases, wherein the exhaust gas cleaning system includes arrangements that require a certain temperature in order to achieve catalytic exhaust gas cleaning. The method includes the following steps:

distributing and storing a limited amount of reducing agent in the exhaust gas passage upstream of the arrangements at a temperature that does not exceed the certain temperature level; and during a cold start of the exhaust gas cleaning system, using the distributed and stored reducing agent in order to achieve the catalytic exhaust gas cleaning.

The limited amount of reducing agent is an appropriate amount that is not included in an amount of reducing agent that is dosed during continuous dosage, during normal, conventional or ordinary operation. The limited amount of reducing agent may be, for example, a deciliter or a half deciliter. The limited amount of reducing agent is intended to be stored temporarily for use during a cold start of the catalytic arrangements.

According to one aspect of the invention, ammonia ($NH_3$) may be released from the distributed and stored reducing agent at a temperature of approximately 130 degrees Celsius. That ammonia can advantageously be used at the catalytic arrangements before the ordinary dosage of reducing agent is started. Ordinary dosage of reducing agent typically starts at a temperature of 180-200 degrees Celsius at the SCR catalyst. The distribution of reducing agent is an appropriately dispersed distribution. According to one design, the limited amount of reducing agent is distributed over as large a surface area at the exhaust gas passage as possible. According to one design, the limited amount of reducing agent is distributed over as large a surface area at a vaporization module at the exhaust gas passage as possible.

According to the method according to the invention, there is an opportunity to distribute and store dosed reducing agent within a rather wide range of temperatures with respect to the temperature at the exhaust gas treatment system, and in this case is not limited in the manner of certain prior art solutions, wherein storage of ammonia at the catalyst must take place at temperatures of 200-350 degrees Celsius.

According to one design, the limited amount of reducing agent is distributed and stored at a temperature at the exhaust gas treatment system of 100-180 degrees Celsius. According to one design, the limited amount of reducing agent is distributed and stored at a temperature at the exhaust gas treatment system of 100-200 degrees Celsius. According to one design, the limited amount of reducing agent is distributed and stored at a temperature at the exhaust gas treatment system of 120-160 degrees Celsius. According to one design, the limited amount of reducing agent is distributed and stored at a temperature at the exhaust gas treatment system of 140 degrees Celsius.

The method may comprise the step of using the distributed and stored reducing agent through a crystalline condition of the reducing agent. This is an alternative method to increase the performance of an SCR system is achieved The method may comprise the step of distributing and storing the limited amount of reducing agent in association with switching off the engine. In this case, advantageous thermal energy of at least one of the exhaust gas passage and the vaporization module can be used according to one aspect of the present invention. Distributing and storing the limited amount of reducing agent, in association with switching off the engine, can produce lower ammonia slip than if the limited amount of reducing agent is distributed and stored in association with the start of the engine.

The method may comprise the step of distributing and storing the limited amount of reducing agent in association with the start of the engine.

To distribute and store the limited amount of reducing agent after switching off the engine, as specified by one design of the present invention, means that the method can also be carried out if the SCR catalyst is very hot, i.e. if the SCR catalyst has a temperature that exceeds a certain limiting value, at the switching off the engine.

The method may comprise the step of distributing the limited amount of reducing agent to form a reducing agent film in the exhaust gas passage. In this case, there is an advantageous possibility, during the heating of an exhaust gas cleaning system, to convert and lead the distributed reducing agent to the catalytic arrangements at an early stage.

The method may comprise the step of distributing the limited amount of reducing agent through the control of a reducing agent dosing unit. This provides an accurate and efficient method according to the invention, in which a spray image of the reducing agent can be influenced in an appropriate manner.

The method may comprise the step of distributing the limited amount of reducing agent through the control of a valve configuration at the exhaust gas treatment system. This achieves an accurate and efficient method according to the invention, in which a spray image of the reducing agent can be influenced in an appropriate manner.

The method may comprise the step of using an exhaust gas flow from the engine to achieve the distribution. This achieves a cost-effective and time-efficient method according to the invention, in which distribution of the reducing agent can be influenced in an appropriate manner.

The method may comprise the step using pressurized air to achieve the distribution. This achieves an efficient method according to the invention, in which distribution of the reducing agent can be influenced in an appropriate manner.

The method is easy to implement in existing motor vehicles. Program code at an exhaust gas cleaning system for an engine according to the invention can be installed in a control unit of the vehicle during manufacture of the control unit. A purchaser of the vehicle can be given the opportunity of choosing the function of the method as an optional extra. Alternatively, program code comprising program code to carry out the innovative method at an exhaust gas cleaning system for an engine can be installed in a control unit of the vehicle during upgrading at a service station. The software in this case can be loaded into a memory in the control unit.

Program code at an exhaust gas cleaning system for an engine can be updated or exchanged where this is appropriate. Furthermore, different parts of the program code at an exhaust gas cleaning system for an engine can be exchanged independently of each other. This modular configuration is advantageous from the point of view of maintenance.

According to one aspect of the present invention, a method is provided for an exhaust gas cleaning system for an engine, comprising means configured to dose a reducing agent to a passage for exhaust gases from the engine for the purposes of cleaning the exhaust gases, wherein the exhaust gas cleaning system includes arrangements that require a certain temperature in order to achieve catalytic exhaust gas cleaning. The arrangement also comprises means configured to distribute a limited amount of reducing agent in the exhaust gas passage for its temporary storage upstream of the arrangements at a temperature that does not exceed the certain temperature level in order to make possible, during a cold start of the exhaust gas cleaning system, use of the distributed and stored reducing agent in order to achieve the catalytic exhaust gas cleaning.

The distributed and stored reducing agent at the arrangement can be used through a crystalline condition of the reducing agent.

The arrangement may comprise means configured to determine switching off of the engine, and means configured to distribute the limited amount of reducing agent in the event that switching off the engine is determined.

The arrangement may comprise means configured to determine start of the engine, and means configured to distribute the limited amount of reducing agent in the event that start of the engine is determined.

The arrangement may comprise means configured to distribute the limited amount of reducing agent to form a reducing agent film in the exhaust gas passage.

The arrangement may comprise a reducing agent dosing unit arranged such that it can be controlled, configured to distribute the limited amount of reducing agent. The dosage unit may be assisted by pressurized air. In this case, a spray image of the dosed limited amount of reducing agent can be influenced in a desirable manner in order to achieve an appropriate distribution.

The arrangement may comprise a valve configuration that can be controlled at the exhaust gas treatment system, and the valve configuration is configured to distribute the limited amount of reducing agent.

The arrangement may be configured to use an exhaust gas flow from the engine in order to achieve the distribution.

The arrangement may comprise pressurized air means configured to achieve the distribution.

The purposes described above are achieved also with a motor vehicle that comprises the arrangement at an exhaust gas cleaning system for an engine. The motor vehicle may be a lorry, a bus or a car.

According to one aspect of the invention, a computer program is provided at an exhaust gas cleaning system for an engine, where the computer program comprises program code in order to cause an electronic control unit or a second computer connected to the electronic control unit to carry out the steps according to the invention.

According to one aspect of the invention, a computer program is provided at an exhaust gas cleaning system for an engine, where the computer program comprises program code stored on a medium that can be read by a computer in order to cause an electronic control unit or a second computer connected to the electronic control unit to carry out the steps according to the invention.

According to one aspect of the invention, a computer program product comprising program code is provided stored on a medium that can be read by a computer, in order to carry out the method steps according to the invention, where the program code is run on an electronic control unit or a second computer connected to the electronic control unit.

Further purposes, advantages and new distinctive features of the present invention will be made clear for one skilled in the arts by the following details, as also during execution of the invention. While the invention is described below, it should be obvious that the invention is not limited to the specific details described. Those skilled in the arts will recognize further applications, modifications and executions within other fields, which lie within the scope of the invention.

BRIEF DESCRIPTION OF DRAWINGS

For a more complete understanding of the present invention and further purposes and advantages of it, reference is now made to the following detailed description, which is to be read together with the accompanying drawings in which the same reference numbers relate to the same parts in the various drawings, and in which.

DETAILED DESCRIPTION OF THE DRAWINGS

Figure 1:
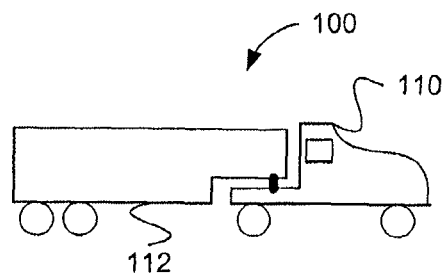
FIG. 1 illustrates schematically a vehicle, according to one embodiment of the invention.

FIG. 1 shows a side view of a vehicle 100. The vehicle 100 taken as an example consists of a drawing vehicle 110 and a trailer 112. The vehicle may be a heavy vehicle, such as a lorry or a bus. Alternatively, the vehicle may be a car. The vehicle may be a truck.

It should be pointed out that the invention is suitable for application at a freely chosen suitable exhaust gas cleaning system that comprises a catalyst for catalytic exhaust gas cleaning. According to one design, the exhaust gas cleaning system includes an SCR catalyst. According to one design, the exhaust gas cleaning system includes an SCR system. According to one design, the exhaust gas cleaning system includes a vaporization module that is arranged in an exhaust gas passage upstream of a catalyst arrangement, for example including the SCR catalyst. According to one design, the exhaust gas cleaning system includes a vaporization module that is arranged in an exhaust gas passage upstream of arrangements for catalytic exhaust gas cleaning, for example including the SCR catalyst.

Aspects of the present invention are described herein with reference to an SCR system. One skilled in the arts will realize that the invention can be applied at other types of exhaust gas cleaning systems than exhaust gas cleaning systems that include an SCR catalyst. In this case, a reducing agent that is suitable for the invention and that has the desired properties is used.

It should be pointed out that the invention is suitable for application at an appropriate SCR system. The SCR system may comprise a DOC unit and an SCR catalyst and is therefore not limited to SCR systems at motor vehicles. The method according to the invention and the arrangement according to the invention are, according to one aspect of the invention, well-suited to other platforms than motor vehicles that include an exhaust gas cleaning system, for example, water-going vessels. The water-going vessels may be of any chosen type such as motor boats, vessels, ferries or ships.

The method according to the invention and the arrangement according to the invention are, according to one aspect of the invention, well-suited for use also with, for example, systems that include, for example, a rock crusher or similar.

The method according to the invention and the arrangement according to the invention are, according to one aspect of the invention, well-suited for use also with, for example, systems that include at least one of industrial engines and motor-driven industrial robots.

The method according to the invention and the arrangement according to the invention are, according to one aspect of the invention, well-suited for use also with, for example, various types of power station, such as, electrical power stations that comprise a diesel-powered electrical generator.

The method according to the invention and the arrangement according to the invention are well-suited for a freely chosen suitable engine system that includes an engine, an SCR system and an SCR catalyst, such as, a railway engine or another platform.

The method according to the invention and the arrangement according to the invention are well-suited for a suitable system that includes an $NO_x$ generator and an SCR system that includes a vaporization module and an SCR catalyst.

The method according to the invention and the arrangement according to the invention are well-suited for a system that includes what is known as a "cDPF" unit. The method according to the invention and the arrangement according to the invention are well-suited for a system that includes what is known as an "ASC" unit.

In this document, the term "link" refers to a communication link that may be a physical line, such as an optoelectronic communication line, or a non-physical line, such as a wireless connection, for example a radio link or microwave link.

In this document, the term "line" refers to a passage to contain and to transport a fluid, such as, a reductant in fluid form. The line may be a pipe of freely chosen dimension. The line may be of a freely chosen and suitable material, such as, plastic, rubber or metal.

In this document, the terms "reductant" and "reducing agent" refer to an agent that is used to react with certain emissions in an SCR system. These emissions may be, for example, $NO_x$ gas. The terms "reductant" and "reducing agent" are used synonymously in this document. The reductant according to one embodiment is known as AdBlue. Naturally, other types of reductants can be used. AdBlue is given as an example of a reductant in this document, but one skilled in the arts will realize that the innovative method and the innovative arrangement can be brought to reality for other types of reductants.

The reducing agent may consist of an aqueous solution including urea. The reducing agent may include an appropriate concentration of urea. The reducing agent may be in liquid form when dosed. The reducing agent may be in gaseous form when dosed. The reducing agent may be in solid form when dosed.

Figure 2:
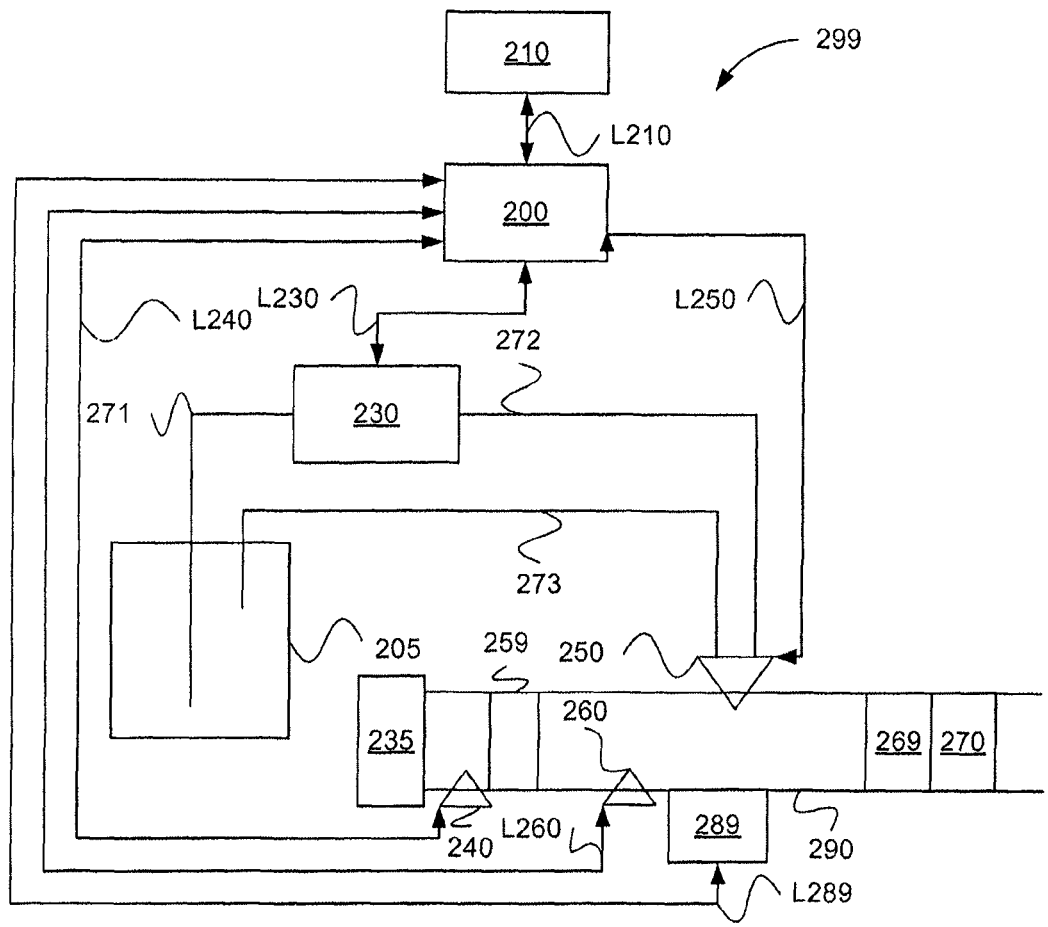
FIG. 2 illustrates schematically an arrangement at an exhaust gas cleaning system for an engine, according to one embodiment of the invention.

FIG. 2 shows an arrangement 299 at the vehicle 100. The arrangement 299 may be arranged in the drawing or towing vehicle 110. The arrangement 299 may constitute a part of an SCR system or it may include an SCR system. An engine 235 suitable for the invention is illustrated schematically in FIG. 2. The engine 235 is a combustion engine. The engine 235 may be a diesel engine. Alternatively, the engine 235 may be driven by petrol, gas or ethanol. An exhaust gas passage 290 is arranged to lead exhaust gases from the engine 235 to its surroundings. The exhaust gas passage 290 may be included in a sound absorber unit.

The arrangement 299 comprises a first control unit 200 configured to control operation of the engine 235.

The arrangement 299 of this example comprises a container 205 configured to contain a reductant. The container 205 is configured to contain a suitable amount of reductant and to be filled when necessary.

A first line 271 is arranged to lead the reductant to a pump 230 from the container 205. The pump 230 may be a freely chosen suitable pump. The pump 230 may be a membrane pump comprising at least one filter. The pump 230 may be driven by means of an electric motor (not shown in the drawings). The pump 230 is configured to pump the reductant up from the container 205 through the first line 271 and to supply the reductant through a second line 272 to a dosage unit 250. The dosage unit 250 may include an electrically controlled dosage arrangement, to control a flow of reductant that has been supplied to the exhaust gas system can be controlled. The first control unit 200 is arranged for communication with the dosage unit 250 over a link L250. The pump 230 is configured to place the reductant under pressure in the second line 272. The dosage unit 250 is arranged with a throttle unit, which can be referred to as a throttle valve, against which the pressure at the reductant can be built up in the arrangement 299.

The dosage unit 250 is to supply the reductant to the exhaust gas passage 290 at the vehicle 100. To be more precise, the dosage unit 250 is arranged to supply, in a controlled manner, a suitable amount of reductant to the exhaust gas passage 290 at the vehicle 100, according to one aspect of the method according to the invention. According to this method, an SCR catalyst 270 is arranged downstream of a position at the exhaust gas system at which supply of reductant takes place. The amount of reductant that is supplied into the exhaust gas system is intended to be used in the SCR catalyst in order to reduce the amount of undesired emissions.

According to an example, a diesel oxidation catalyst 259 is arranged in the exhaust gas passage 290 downstream of the engine. The diesel oxidation catalyst 259 is arranged in the exhaust gas passage 290 upstream of the SCR catalyst 270 and upstream of the dosage unit 250. The diesel oxidation catalyst 259 may be known as a "DOC unit". The diesel oxidation catalyst 259 is arranged to convert NO gas from the engine 235 to $NO_2$ gas. The diesel oxidation catalyst 259 may be arranged also to oxidise fuel in order to achieve a temperature increase at the exhaust gases.

The exhaust gas passage 290 comprises a vaporization module 269. The exhaust gas passage 290 may include a piece of pipe upstream of the vaporization module 269. The vaporization module 269 is arranged upstream of the SCR catalyst 270. The vaporization module 269 is arranged downstream of the dosage unit 250. The vaporization module 269 may be designed in an appropriate manner. The vaporization module 269 is arranged to make possible efficient vaporization of dosed reducing agent. According to one aspect of the present invention, the vaporization module 269 is arranged to store a limited amount of reducing agent that has been added, which can be used for exhaust gas cleaning during a cold start of the SCR system. According to one aspect of the present invention, the exhaust gas passage 290 is arranged to store a limited amount of reducing agent that has been added, which can be used for exhaust gas cleaning during a cold start of the SCR system. The added limited amount of reducing agent can be stored in the exhaust gas passage 290 upstream of the vaporization module 269 or in the vaporization module 269.

The dosage unit 250 is arranged at the exhaust gas passage 290 that is arranged to lead exhaust gases from the engine 235 at the vehicle 100 to the DOC unit 259, onwards to the vaporization module 269 and the SCR catalyst 270, and onwards to the surroundings of the vehicle.

A third line 273 is arranged between the dosage unit 250 and the container 205. The third line 273 is configured to lead back a certain amount of the reductant that has been fed to the dosage valve 250 to the container 205.

The first control unit 200 is configured for communication with the pump 230 through a link L230. The first control unit 200 is configured to control operation of the pump 230. According to one example, the first control unit 200 is configured to control the pump 230 by means of an electric motor (not shown in the drawings). The first control unit 200 is arranged to influence a working pressure in the second line 272. This can take place in various suitable ways. According to one example, the first control unit 200 is configured to change a prevalent rate of revolution, RPM, at the pump 230. The pressure can in this case be changed in the manner desired. The working pressure can be increased by increasing the rate of revolution at the pump 230. The working pressure can be decreased by decreasing the rate of revolution at the pump 230. By controlling the pressure of the reducing agent in the second line 272 by means of the pump 230, a spray pattern of the dosed reducing agent can be influenced and in this way controlled. In this way, a distribution of the dosed reducing agent in the exhaust gas passage 290 can be controlled in an appropriate manner. In particular, a spray pattern of the dosed reducing agent in a limited amount, according to one aspect of the present invention, can be controlled such that a desired distribution and storage of the reducing agent is achieved.

By controlling the pressure of the reducing agent in the second line 272 by means of the throttle unit at the dosage unit 250, a spray pattern of the dosed reducing agent can be influenced and in this way controlled. In this way, a distribution of the dosed reducing agent in the exhaust gas passage 290 can be controlled in an appropriate manner.

According to one design, the dosage unit 250 is arranged with a nozzle that can be controlled. The first control unit 200 is arranged to control the nozzle. In this way, the nozzle can be directed in an appropriate manner. In this way, a spray pattern of the dosed reducing agent can be influenced and in this way controlled. In this way, a distribution of the dosed reducing agent in the exhaust gas passage 290 can be controlled in an appropriate manner.

The first control unit 200 is arranged for communication with a first temperature sensor 240 through a link L240. The temperature sensor 240 is arranged to detect a prevalent temperature T1 of a flow of exhaust gases from the engine of the vehicle. According to one example, the first temperature sensor 240 is arranged at the exhaust gas passage 290 immediately downstream of the engine of the vehicle and upstream of the DOC unit, and in this way upstream of the dosage unit 250. The first temperature sensor 240 may be arranged at a suitable location at the exhaust gas passage 290. The first temperature sensor 240 is arranged to detect continuously a prevalent temperature T1 of the flow of exhaust gases and to send signals containing information about the prevalent temperature T1 over the link L240 to the first control unit 200.

The first control unit 200 is arranged for communication with a second temperature sensor 260 through a link L260. The second temperature sensor 260 may be arranged to detect a prevalent temperature T2 at a surface in the exhaust gas system at which the reducing agent is vaporized. The second temperature sensor 260 may be arranged to detect a prevalent temperature T2 at the exhaust gas passage 290 at a suitable location. The second temperature sensor 260 may be arranged to detect a prevalent temperature T2 at a suitable surface or component of the exhaust gas passage 290.

According to one example, the second temperature sensor 260 is arranged at the exhaust gas passage 290 upstream of the dosage unit 250. According to one example, the second temperature sensor 260 is arranged to detect a prevalent temperature T2 at the DOC unit 259. According to one example, the second temperature sensor 260 is arranged in the exhaust gas passage 290 upstream of the dosage unit 250. According to a second example, the second temperature sensor 260 is arranged in the vaporization module 269 or in the SCR catalyst 270 downstream of the dosage unit 250.

The second temperature sensor 260 is arranged to detect continuously a prevalent temperature T2 of a surface or a component at the exhaust gas passage 290 and to send signals containing information about the prevalent temperature T2 over the link L260 to the first control unit 200.

According to one design, at least one of the first control unit 200 and the second control unit 210 is arranged to calculate the first temperature T1. This can take place by means of a stored calculation model. At least one of the first control unit 200 and the second control unit 210 may be arranged to calculate the first temperature T1 on the basis of, for example, a prevalent mass flow of exhaust gases, the prevalent rate of revolution of the engine, and the prevalent load on the engine.

According to one design, at least one of the first control unit 200 and a second control unit 210 is arranged to calculate the second temperature T2. This can take place by means of a stored calculation model. At least one of the first control unit 200 and the second control unit 210 may be arranged to calculate the second temperature T2 on the basis of, for example, an ambient temperature determined at the vehicle 100. At least one of the first control unit 200 and the second control unit 210 may be arranged to calculate the second temperature T2 on the basis of, for example, at least one of a determined period of time since the engine 235 was switched off, the ambient temperature at the vehicle 100, the determined accumulated heat production at the engine 235 before switching off, and the temperature at the engine 235 when it was switched off. At least one of the first control unit 200 and the second control unit 210 may be arranged to calculate the second temperature T2 on the basis of the first temperature T1.

The first control unit 200 is arranged to dose, by means of the dosage unit 250 that is arranged such that it can be controlled, and in this way distribute and store a limited amount of reducing agent in the exhaust gas passage 290 upstream of the SCR catalyst 270 at a temperature that does not exceed a predetermined temperature, for example 190 degrees Celsius. This distributed and stored limited amount of reducing agent can, during a cold start of an exhaust gas cleaning system including the vaporization module 269 and SCR catalyst 270, be used for the purpose of cleaning exhaust gases.

The first control unit 200 is arranged to dose, by means of the dosage unit 250, the reducing agent such that the reducing agent, according to one aspect of the invention, can be used of the purpose of cleaning exhaust gases after first having been in a solid state, i.e. in a crystalline condition, and subsequently converted to gaseous form for use at the SCR catalyst 270. The reducing agent in gaseous form may include ammonia.

The first control unit 200 may be arranged to dose, by means of the dosage unit 250, and in this way to distribute and store, the limited amount of reducing agent in association with switching off of the engine 235. The first control unit 200 may be arranged to dose, by means of the dosage unit 250, and in this way to distribute and store, the limited amount of reducing agent in association with start of the engine 235. The first control unit 200 may be arranged to distribute, by means of the dosage unit 250, the limited amount of reducing agent in order to form at least one film of reducing agent in at least one of the exhaust gas passage 290 and the vaporization module 269. The first control unit 200 may be arranged to control the dosage unit 250 in order to dose, according to one aspect of the invention, the limited amount of reducing agent such that a suitable layer of reducing agent according to the invention is formed in at least one of the exhaust gas passage 290 and the vaporization module 269. The first control unit 200 may be arranged to control a valve configuration at the SCR system in order to achieve an appropriate working pressure of the reducing agent, whereby an appropriate distribution of the limited amount of reducing agent is achieved at the exhaust gas treatment system. The first control unit 200 may be arranged to dose and in this way distribute and store the limited amount of reducing agent through the use, during the switching off of engine 235, of an exhaust gas flow from the engine 235 in order to achieve the distribution. The first control unit 200 may be arranged to control, during the distribution and storage, pressurized air means in order to achieve a suitable layer of reducing agent, according to the invention, in at least one of the exhaust gas passage 290 and the vaporization module 269.

The first control unit 200 is arranged for communication with the dosage unit 250 over a link L250. The first control unit 200 is arranged to control operation of the dosage unit 250 in order, for example, to regulate the supply of the reductant to the exhaust gas system of the vehicle 100.

The first control unit 200 may be arranged to calculate a mass flow MF of exhaust gases from the engine of the vehicle. The first control unit 200 may be arranged to determine continuously a mass flow MF of exhaust gases from the engine of the vehicle. This may take place in a suitable manner. The first control unit 200 may be arranged, according to one example, to distribute, by means of the dosage unit 250, the limited amount of reducing agent at the exhaust gas passage 290 on the basis of the exhaust gas mass flow MF that has been determined. The exhaust gas flow during the switching off of the engine 235 can be used to achieve an appropriate distribution of the dosed limited amount of reducing agent in at least one of the exhaust gas passage and the vaporization module 269. According to the method according to the invention, the purpose is not to store reducing agent in the form of, for example, ammonia in the SCR catalyst 270.

According to one design, the subsystem comprises a mass flow sensor (not shown in the drawings) that is arranged to measure continuously a prevalent mass flow MF of exhaust gases from the engine of the vehicle 100 in the exhaust gas passage 290 upstream of the SCR catalyst 270. The mass flow sensor is arranged to send continuously signals comprising information about a prevalent mass flow MF of exhaust gases to the first control unit 200 over a link arranged for this purpose.

The second control unit 210 is arranged for communication with the first control unit 200 over a link L210. The second control unit 210 may be connected to the first control unit 200 in a manner that allows it to be removed. The second control unit 210 may be a control unit that is external to the vehicle 100. The second control unit 210 may be arranged to carry out the method steps according to the invention. The second control unit 210 may be used to transfer program code to the first control unit 200, in particular, program code to carry out the method according to the invention. Alternatively, the second control unit 210 may be arranged for communication with the first control unit 200 over an internal network in the vehicle. The second control unit 210 may be arranged to carry out essentially similar functions as the first control unit 200, such as, to supply and in this way distribute and store a limited amount of reducing agent in the exhaust gas passage 290 upstream of the SCR catalyst 270 at a temperature that does not exceed the certain temperature level Tmax, and to use, during a cold start of the exhaust gas cleaning system, the distributed and stored reducing agent in order to achieve the catalytic exhaust gas cleaning.

According to one design, more than one dosage unit 250 can be provided. The first control unit 200 is in this case arranged to control these further dosage units in a corresponding manner as the dosage unit 250. In the case in which more than one dosage unit 250 is used according to the method according to the invention, these may interact in order to achieve an essentially optimal distribution and storage of the limited amount of reducing agent added. The first control unit 200 is arranged to control the various dosage units such that dosage of the limited amount of reducing agent takes place sequentially, alternately or simultaneously, or in a combination of these methods. The total amount of the limited amount of reducing agent that is to be distributed and stored according to the present invention may be distributed between the various dosage units in an appropriate manner. According to one design given as an example, in which the arrangement 299 includes two dosage units 250, the relevant dosage units 250 may each dose half of the limited amount of reducing agent. According to one design given as an example, in which the arrangement 299 includes two dosage units 250, the relevant dosage units 250 may dose 90% and 10%, respectively, of the limited amount of reducing agent.

According to one embodiment, pressurized air means 289 is provided. The first control unit 200 is in this case arranged for communication with the pressurized air means 289 through a link L289. The first control unit 200 is arranged to control the pressurized air means 289. The pressurized air means 289 is configured to supply a flow of air at the exhaust gas passage 290 in order to achieve an appropriate distribution and storage of the limited amount of reducing agent at at least one of the exhaust gas passage 290 and the vaporization module 269. The pressurized air means is described with reference also to FIG. 3. The pressurized air means 289 can be advantageously used for the distribution of the limited amount of reducing agent when the engine 235 is switched off. The pressurized air means 289 can be advantageously used for the distribution of the limited amount of reducing agent when the reducing agent is dosed according to the present invention.

Figure 3:
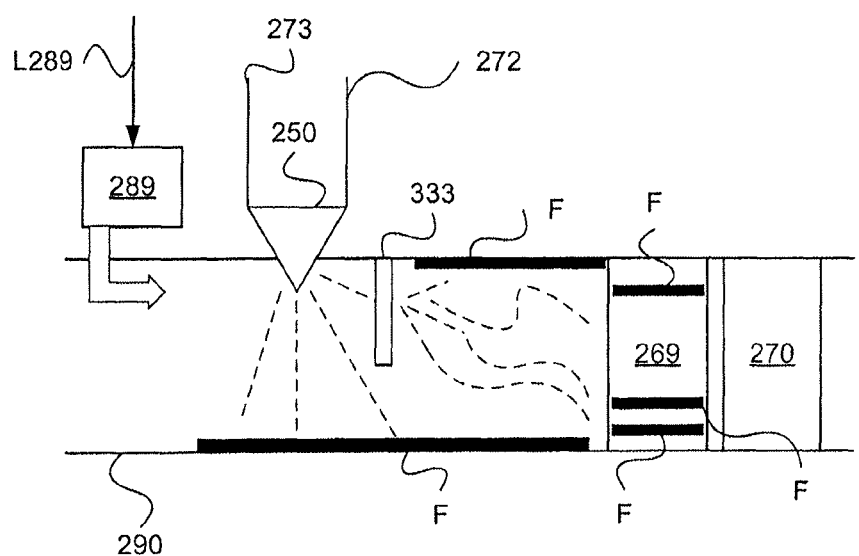
FIG. 3 illustrates schematically a part of an exhaust gas cleaning system for an engine, according to one embodiment of the invention.

FIG. 3 illustrates schematically a part of an exhaust gas cleaning system for an engine 235, according to one embodiment of the invention.

In this case, the exhaust gas passage 290 including the vaporization module 269 and the SCR catalyst 270 are illustrated. Furthermore, the dosage unit 250, the second line 272 and the third line 273 are illustrated. The pressurized air means 289 is arranged to supply, on the basis of control signals received through the link L289 from the first control unit 200, pressurized air to the exhaust gas passage 290 in an appropriate manner. A suitable distribution of the limited amount of reducing agent can in this way be achieved according to one aspect of the present invention. It should be noted that the pressurized air means may be arranged, as an alternative, to supply a freely chosen suitable gas to the exhaust gas passage 290, not necessarily air.

According to one aspect of the present invention, a limited amount of reducing agent is dosed, and in this manner distributed and stored, at a temperature at the exhaust gas passage 290 that does not exceed a predetermined temperature Tmax. The distributed reducing agent constitutes in this way one or several thin films F at the walls at the exhaust gas passage 290 or in the vaporization module 269. The film F can also be denoted by layer/coat/lining. The film F can, according to one design, be thinner than 1 mm, for example 0.1 mm or 0.5 mm. The film F can, according to one design, be thicker than 1 mm. The film F can comprise sections at which there is no reducing agent present. The film F can, therefore, comprise one or several holes. The film F is advantageously distributed in such a manner that reducing agent can be rapidly emitted on increases in temperature during the cold start of the SCR system. The reducing agent can in this way be led, in an appropriate composition (for example, ammonia) to the SCR catalyst 270 for exhaust gas cleaning.

The film F can be constituted, at least partially, by reducing agent in the fluid phase. The film F can be constituted, at least partially, by reducing agent in the solid phase, for example in the form of crystals of reducing agent.

According to one design given as an example, distribution means 333 may be provided. These distribution means 333 may be designed in a suitable manner, as, for example, a net or propeller. The distribution means 333 are arranged to distribute the limited amount of reducing agent in an appropriate manner. In this way, an efficient means is obtained to optimize the distribution of the limited amount of reducing agent in at least one of the exhaust gas passage 290 and the vaporization module 269. The distribution means 333 are arranged downstream of the dosage unit 250. The distribution means 333 are arranged to finely disperse and spread the dosed limited amount of reducing agent during the distribution and storage of the same in at least one of the exhaust gas passage 290 and the vaporization module 269.

Figure 4A:
FIG. 4a illustrates schematically a flow diagram of a method according to one embodiment of the invention.
Figure 4A:
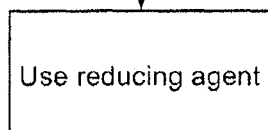
Figure 4A:

FIG. 4a illustrates schematically a flow diagram of a method at an exhaust gas cleaning system for an engine 235 in which a reducing agent is added to a passage 290 for exhaust gases from the engine 235 for the purposes of cleaning the exhaust gases, and where the exhaust gas cleaning system includes arrangements 270 that require a certain temperature level Tmax in order to achieve catalytic exhaust gas cleaning. The method comprises a first method step s401. The step s401 comprises the following steps:

to distribute and store a limited amount of reducing agent in the exhaust gas passage 290 upstream of the arrangements 270 at a temperature that does not exceed the certain temperature level Tmax, and to use during a cold start of the exhaust gas cleaning system the distributed and stored reducing agent in order to achieve the catalytic exhaust gas cleaning.

The method is terminated after the step s401.

Figure 4B:
FIG. 4b illustrates schematically in greater detail a flow diagram of a method according to one aspect of the invention.
Figure 4B:
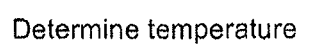
Figure 4B:
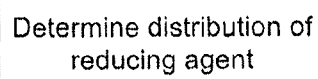
Figure 4B:
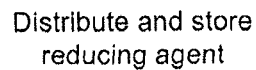
Figure 4B:
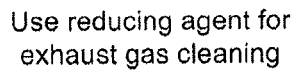
Figure 4B:

FIG. 4b illustrates schematically a flow diagram of a method at an exhaust gas cleaning system for an engine 235 in which a reducing agent is added to a passage 290 for exhaust gases from the engine 235 for the purposes of cleaning the exhaust gases, and where the exhaust gas cleaning system includes arrangements 270 that require a certain temperature level Tmax in order to achieve catalytic exhaust gas cleaning, according to one aspect of the present invention.

The method includes a first method step s410. The method step s410 includes the step to determine a currently prevalent second temperature T2 at the exhaust gas passage 290. This may involve determining a second temperature T2 at, for example, the DOC unit 259, the SCR catalyst 270, the vaporization module 269 or a wall at the exhaust gas passage 290. The method may include the step of determining the first temperature T1. The second temperature T2 can be determined on the basis of the first temperature T1 of the exhaust gases from the engine 235. In the case in which the second temperature T2 does not exceed a predetermined temperature Tmax, for example 180 or 200 degrees Celsius, the method according to the invention can be carried out. After the method step s410, a subsequent method step s420 is in this case carried out.

The method step s420 includes the step of determining a distribution of a limited amount of reducing agent. The step s420 can include the step of determining an amount or volume of reducing agent that is to correspond to the limited amount of reducing agent. The volume may be, according to one example, 0.1 liter, or 0.05 liter. The limited amount of reducing agent is an appropriate amount of reducing agent. The limited amount of reducing agent may be, for example, 30, 100 or 600 gram of Adblue. The distribution of the limited amount of reducing agent is adapted, according to the method according to the invention, such that it does not lead to excessively large crystals of reductant being formed in the exhaust gas passage 290 or in the vaporization module 269. The limited amount of reducing agent may be an amount based on or related to, or both based on and related to, a maximum possible storage of ammonia in an SCR catalyst. An SCR catalyst may have a certain maximum possible storage capacity (the amount of ammonia that the SCR catalyst can "hold" at a certain temperature) that is x gram per unit of volume, for example x gram of ammonia per liter. The maximum possible storage in this way thus depends on the magnitude/volume of the SCR catalyst specified in the units of "liters". The maximum possible storage at the SCR catalyst may depend also on, and it may be specified in, some other applicable unit. The maximum possible storage of ammonia in an SCR catalyst may be 0.5 gram/liter. The maximum possible storage of ammonia in an SCR catalyst may be 0.8 gram/liter. The maximum possible storage of ammonia in an SCR catalyst may be 2 gram/liter. As will be realized, the maximum possible storage of ammonia may be less than 0.5 gram/liter or greater than 2 gram/liter. The limited amount of reducing agent may be an amount of the same order of magnitude as a maximum possible storage of ammonia in an SCR catalyst. The limited amount of reducing agent may be an amount that is less than, or equal to, a maximum possible storage of ammonia in the SCR catalyst. The limited amount of reducing agent may be an amount that is greater than, or equal to, a maximum possible storage of ammonia in the SCR catalyst. The limited amount of reducing agent may be an amount that is less than, or equal to, 50% of a maximum possible storage of ammonia in the SCR catalyst. The limited amount of reducing agent may be an amount that is less than, or equal to, 25% of a maximum possible storage of ammonia in the SCR catalyst. The limited amount of reducing agent may be an amount that corresponds to or results in 50 gram of ammonia that reacts with $NO_x$ gas in the SCR catalyst. The limited amount of reducing agent may be an amount that corresponds to or results in 25 gram of ammonia that reacts with $NO_x$ gas in the SCR catalyst. The limited amount of reducing agent may be an amount that corresponds to or results in 8 gram of ammonia that reacts with $NO_x$ gas in the SCR catalyst. The limited amount of reducing agent may be an amount that corresponds to or results in 2.5 gram of ammonia that reacts with $NO_x$ gas in the SCR catalyst. The limited amount of reducing agent may be an amount that results in ammonia slip during a subsequent increase in temperature from the SCR catalyst that does not exceed a predetermined limiting value. The limited amount of reducing agent may be an amount that results in an ammonia slip during a subsequent increase in temperature from the SCR catalyst that, after having passed an ASC (ammonia slip catalyst), does not exceed a predetermined limiting value. The limiting value may be essentially equal to zero. The limiting value may be a suitable predetermined value. The limiting value may be a suitable predetermined value that is based on currently valid legal requirements. The resulting ammonia slip may be an estimated or predicted resulting ammonia slip. The resulting ammonia slip may be estimated/predicted/calculated through the use of an applicable calculation model. The limited amount of reducing agent may be an amount that corresponds to or results in that an amount of crystals of reducing agent that are formed in the exhaust gas passage 290 or in the vaporization module 269 does not exceed a predetermined maximum amount of reducing agent. The amount of reducing agent crystals may correspond to the above-mentioned amount of ammonia that reacts with $NO_x$ gas in the SCR catalyst. The limited amount of reducing agent may be an amount that is based on properties, such as for example possible storage capacity, of the SCR catalyst during a cold start. The limited amount of reducing agent may be an amount that is based on properties of the SCR catalyst during a process that follows a cold start.

The limited amount of reducing agent is to be distributed and stored, according to one aspect of the invention, only temporarily in the exhaust gas passage 290 before its use during a cold start of the SCR system, i.e. the limited amount of reducing agent is not to be permanently stored in the exhaust gas passage 290. The temporarily stored limited amount of reducing agent is to be consumed according to the method according to the invention. The temporarily stored limited amount of reducing agent/ammonia is intended to react with $NO_x$ gas in the SCR catalyst and to be converted to nitrogen and water.

The step s420 includes also the step of determining an appropriate manner to distribute the limited amount of reducing agent after dosage. A permanent configuration for the dosage can in this way be determined. The permanent configuration may, for example, concern a period of time during which the dosage unit is open and during which the dosing of reducing agent takes place. It can in this way be determined whether the pressurized air means 289 is to be used for the distribution. It can in this way be determined whether a flow of exhaust gases from the engine 235 is to be used for the distribution. It can in this way be determined whether more than one dosage unit 250 is to be used. It can in this way be determined how a suitable spray image for the dosage is to be designed. After the method step s420, a subsequent method step s430 is carried out.

The method step s430 includes the step of distributing and storing the limited amount of reducing agent in the appropriate manner that has been determined. This may be carried out in various suitable ways. After the method step s430, a subsequent method step s440 is carried out.

The method step s440 includes the step of using the limited amount of distributed and stored reducing agent for exhaust gas cleaning in the SCR catalyst 270. As the second temperature T2 gradually increases during heating of the SCR system, the stored reducing agent will gradually be emitted in the form of, for example, ammonia and can be led by means of the exhaust gas flow of the engine to the SCR catalyst 270. According to one alternative design, the stored reducing agent can be gradually emitted in the form of, for example, gaseous ammonia and can be led by means of a flow of air caused by the pressurized air means to the SCR catalyst 270, possibly in combination with the exhaust gas flow from the engine 235. According to the invention, the complete limited amount of distributed and stored reducing agent that has temporarily been present in at least one of the exhaust gas passage 290 and the vaporization module 269 is used. The method according to the invention is ended after the method step s440.

Figure 5:
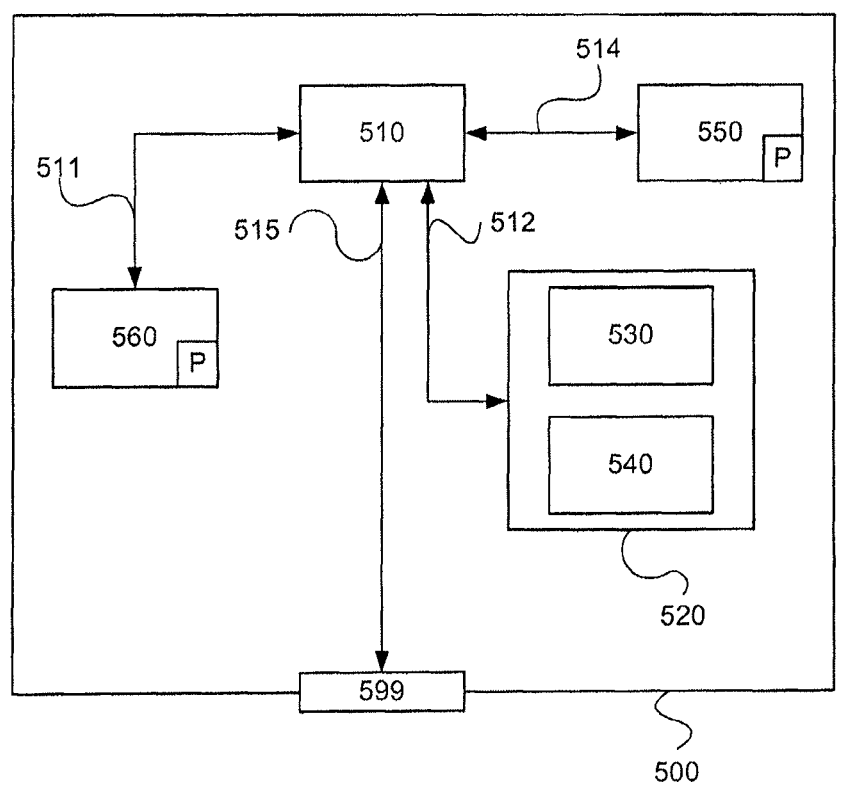
FIG. 5 illustrates schematically a computer according to one embodiment of the invention.

With reference to FIG. 5, there is shown a drawing of a design of an arrangement 500. The control units 200 and 210 that are described with reference to FIG. 2 may, in one design, comprise the arrangement 500. The arrangement 500 comprises a non-transient memory 520, a data processing unit 510 and a read/write memory 550. The non-transient memory 520 has a first section of memory 530 in which a computer program, such as an operating system, is stored in order to control the function of the arrangement 500. Furthermore, the arrangement 500 comprises a bus controller, a serial communication port, I/O means, an ND converter, a unit for the input and transfer of time and date, an event counter and an interrupt controller (not shown in the drawing). The non-transient memory 520 has also a second section of memory 540.

A computer program P is provided that comprises procedures at an exhaust gas cleaning system for an engine 235 in which a reducing agent is added to a passage 290 for exhaust gases from the engine 235 for the purposes of cleaning the exhaust gases, and where the exhaust gas cleaning system includes arrangements 270 that require a certain temperature level Tmax in order to achieve catalytic exhaust gas cleaning.

The computer program P may comprise procedures to dose a limited amount of reducing agent and in this way to distribute and store the limited amount of reducing agent in at least one of the exhaust gas passage 290 and in a vaporization module arranged upstream of the exhaust gas passage upstream of the SCR catalyst 270 at a temperature that does not exceed the certain temperature level Tmax, in order to provide and to use, during a cold start of the exhaust gas cleaning system, the distributed and stored reducing agent in order to achieve the catalytic exhaust gas cleaning. The computer program P may comprise procedures to distribute and store the limited amount of reducing agent in association with switching off of the engine 235. The computer program P may comprise procedures to distribute and store the limited amount of reducing agent in association with start of the engine 235. The computer program P may comprise procedures to distribute the limited amount of reducing agent in order to form a reducing agent film F in at least one of the exhaust gas passage 290 and the vaporization module 269. The computer program P may comprise procedures to distribute the limited amount of reducing agent through the control of a reducing agent dosing unit 250. The computer program P may comprise procedures to distribute the limited amount of reducing agent through the control of a valve configuration (not shown in the drawings) at the exhaust gas treatment system. The computer program P may comprise procedures to control the operation of the engine 235 and in this way to use an exhaust gas flow from the engine 235 in order to achieve the distribution. The computer program P may comprise procedures to control pressurized air means 289 and in this way to use pressurized air supplied in the exhaust gas passage 290 in order to achieve the distribution.

The program P may be stored in an executable form or in a compressed form in at least one of a memory 560 and a read/write memory 550.

When it is described that the data processing unit 510 carries out a certain function, it is to be understood that the data processing unit 510 carries out a certain part of the program that is stored in the memory 560, or a certain part of the program that is stored in the read/write memory 550.

The data processing arrangement 510 can communicate with a data port 599 through a data bus 515. The non-transient memory 520 is intended for communication with the data processing unit 510 through a data bus 512. The separate memory 560 is intended to communicate with the data processing unit 510 through a data bus 511. The read/write memory 550 is arranged to communicate with the data processing unit 510 through a data bus 514. The links L210, L230, L240, L250, L260 and L289 can, for example, be connected to the data port 599 (see FIGS. 2 and 3).

When data is received at the data port 599, it is temporarily stored in the second section of memory 540. When the data that has been received has been temporarily stored, the data processing unit 510 is prepared for the execution of code in a manner that has been described above.

According to one design, signals received at the data port 599 comprise information about a prevalent temperature T2 at a suitable surface at, or a component in, the exhaust gas passage 290, for example at least one of a temperature T2 prevalent at the SCR catalyst 270 and a temperature T2 at the DOC unit 259.

The signals that are received at the data port 599 can be used by the arrangement 500 to dose and in this way to distribute and store a limited amount of reducing agent in the exhaust gas passage upstream of the SCR catalyst at a temperature that does not exceed the certain temperature level Tmax. The distributed and stored reducing agent can in this way be used during a cold start of the exhaust gas cleaning system.

Parts of the methods described here may be carried out by the arrangement 500 with the aid of the data processing unit 510, which runs the program stored in the memory 560 or in the read/write memory 550. When the arrangement 500 runs the program, the method described here is executed.

The previous description of the preferred embodiments of the present invention has been provided for the purposes of illustration and description of the invention. It is not intended to be exhaustive or to limit the invention to the variants that have been described. Many modifications and variations will be obvious for one skilled in the arts. The embodiments were selected and described in order to best explain the principles of the invention and its practical applications, and thus to make it possible for those skilled in the arts to understand the invention for various embodiments and with the various modifications that are appropriate for the intended use.

What is claimed is:

1. A method for operating an exhaust gas cleaning system of a combustion engine, the system comprising:
an exhaust passage for leading exhaust gases from the engine to arrangements that require a selected temperature level (Tmax) in order to achieve catalytic exhaust gas cleaning, the arrangements including an SCR catalyst, and the method comprising the steps:
while the engine is off, distributing a limited amount of reducing agent from a dosage unit into the exhaust passage, the limited amount of reducing agent being selected from a pre-set range;
storing the limited amount of reducing agent in a vaporization module that vaporizes reducing agent and is located upstream of the SCR catalyst, the limited amount of reducing agent not being an amount of reducing agent dosed during continuous dosage, or ordinary operation of the system;
dispersing and spreading the limited amount of reducing agent downstream of the dosage unit and upstream of the vaporization module before storing the limited amount of reducing agent in the vaporization module; and
during the cold start of the exhaust gas cleaning system, using the distributed and stored reducing agent to achieve the catalytic exhaust gas cleaning,
wherein the distributing comprises determining a way to distribute the reducing agent selected from a plurality of different ways of distributing the reducing agent;
wherein the dispersing and spreading is carried out with a propeller located upstream of the vaporization module; and
wherein the distributing is performed when temperature of the exhaust gas cleaning system is in the range 100-180 degrees Celsius.

2. The method according to claim 1, further comprising the step:
using the distributed and stored reducing agent through a crystalline condition of the reducing agent.

3. The method according to claim 1, further comprising the step of distributing and storing the limited amount of reducing agent in association with start of the engine.

4. The method according to claim 1, further comprising the step of distributing a limited amount of reducing agent to form a reducing agent film at the wall of the exhaust gas passage.

5. The method according to claim 1, further comprising the step of distributing the limited amount of reducing agent through the control of a reducing agent dosing unit.

6. The method according to claim 1, further comprising the step of distributing the limited amount of reducing agent through the control of a valve configuration at the exhaust gas treatment system.

7. The method according to claim 1, further comprising the step of using an exhaust gas flow from the engine for achieving the distribution.

8. A computer program product comprising a non-volatile computer readable storage medium, and a computer program comprising program code stored on the medium readable by a computer or an electronic control unit; and
the program code is configured to carry out the method steps according to claim 1, when the program code is run on an electronic control unit or a second computer connected to the electronic control unit.

9. The method according to claim 1, wherein the pre-set range is between a half deciliter and a deciliter.

* * * * *